US012683306B2

(12) United States Patent
Tao

(10) Patent No.: US 12,683,306 B2
(45) Date of Patent: Jul. 14, 2026

(54) POWER STRIP

(71) Applicant: Deals Realm LLC, Eastvale, CA (US)

(72) Inventor: Yuebo Tao, Eastvale, CA (US)

(73) Assignee: Deals Realm LLC, Eastvale, CA (US)

( * ) Notice: Subject to any disclaimer, the term of this patent is extended or adjusted under 35 U.S.C. 154(b) by 302 days.

(21) Appl. No.: 18/504,138

(22) Filed: Nov. 7, 2023

(65) Prior Publication Data

US 2024/0178587 A1 May 30, 2024

(30) Foreign Application Priority Data

Nov. 24, 2022 (CN) ......................... 202223135142.8

(51) Int. Cl.
*H01R 9/26* (2006.01)
*H01R 13/11* (2006.01)
*H01R 13/502* (2006.01)
*H01R 25/00* (2006.01)

(52) U.S. Cl.
CPC ........... *H01R 9/2608* (2013.01); *H01R 13/11* (2013.01); *H01R 13/502* (2013.01); *H01R 25/003* (2013.01)

(58) Field of Classification Search
CPC .... H01R 9/2608; H01R 13/11; H01R 13/502; H01R 25/003; H02G 3/18; H02G 3/10
See application file for complete search history.

(56) References Cited

U.S. PATENT DOCUMENTS

| | | | | |
|---|---|---|---|---|
| 8,690,590 B2 * | 4/2014 | Byrne | H05K 5/03 | |
| | | | 439/131 | |
| 10,116,094 B2 * | 10/2018 | Byrne | H01R 13/703 | |
| 11,251,562 B2 * | 2/2022 | Byrne | H01R 31/02 | |
| 2007/0268635 A1 * | 11/2007 | Bonasia | H01H 83/04 | |
| | | | 361/42 | |
| 2016/0022030 A1 * | 1/2016 | Scott | H01R 13/60 | |
| | | | 439/31 | |
| 2017/0156490 A1 * | 6/2017 | Newhouse | A47B 21/06 | |
| 2017/0317458 A1 * | 11/2017 | Byrne | H01R 25/006 | |
| 2024/0178587 A1 * | 5/2024 | Tao | H01R 13/502 | |

* cited by examiner

*Primary Examiner* — Abdullah A Riyami
*Assistant Examiner* — Nader J Alhawamdeh
(74) *Attorney, Agent, or Firm* — ScienBiziP, P.C.

(57) ABSTRACT

A power strip, comprising: a main body comprising defines a supporting surface and a socket surface; at least one receiving space on the supporting surface; at least one mounting component; and at least one fixing structure corresponding to the at least one receiving space, wherein each of the at least one fixing structure is configured to rotatably mount a corresponding one of the at least one mounting component on the supporting surface, wherein the at least one mounting component is switchable between a closed state and an open state, in the close state, each of the at least one mounting component is received in a corresponding one of the at least one receiving space, and in the open state, the at least one mounting component is rotated relative to the main body and extends out of the corresponding receiving space.

20 Claims, 9 Drawing Sheets

A-A′

POWER STRIP

TECHNICAL FIELD

The present disclosure relates to a power strip that mounting components are adjustable.

BACKGROUND

Power strips, which provide multiple power outlets and extend the connection terminals, have become popular among consumers. However, with the continuous improvement of living standards, various types of electrical appliances have emerged. To adapt to the various types of appliances, desktop type power strips and wall-mounted power strips have been introduced into the market.

However, desktop type power strips cannot be used for wall mounting. Wall-mounted power strips, on the other hand, require screws or hooks on the wall and have mounting components extending outward from a main body of the wall-mounted power strips. When using the wall-mounted power strip on a desktop, the mounting components occupy space and may also affect the overall appearance.

SUMMARY OF INVENTION

The present disclosure provides a power strip that can conveniently function as both desktop and wall-mounted power strips.

One aspect of power strip of the present disclosure comprising: a main body comprising a supporting surface; a socket surface; one or more electrical connection structures setting inside the main body; and at least one receiving space on the supporting surface; at least one mounting component, wherein the supporting surface is mountable on a fixed surface via the at least one mounting component; and at least one fixing structure corresponding to the at least one receiving space, wherein each of the at least one fixing structure is configured to rotatably mount a corresponding one of the at least one mounting component on the supporting surface, wherein the at least one mounting component is switchable between a closed state and an open state, in the close state, each of the at least one mounting component is received in a corresponding one of the at least one receiving space, and in the open state, the at least one mounting component is rotated relative to the main body and extends out of the corresponding receiving space.

One aspect of power strip of the present disclosure comprising: a main body comprising a supporting surface, a socket surface, and one or more electrical connection structures setting inside the main body, at least one mounting component, wherein the supporting surface is mountable on a fixed surface via the at least one mounting component; and at least one fixing structure corresponding to the at least one receiving space, wherein each of the at least one fixing structure is configured to rotatably mount a corresponding one of the at least one mounting component on the supporting surface, wherein: the at least one mounting component defines a first fitting surface, and the at least one fixing structure defines a second fitting surface engaged with the first fitting surface of the corresponding mounting component, multiple first concave sections and multiple first convex sections are defined on the first fitting surface, the multiple first concave and convex sections are alternately arranged, multiple second convex sections and multiple second concave sections are defined on the second fitting surface, the multiple second convex and concave sections are alternately arranged, and the first fitting surface is rotates relative to the second fitting surface when the at least one mounting component rotates, thereby causing each of the multiple first convex section of the first fitting surface to move from one of the multiple second concave sections of the second fitting surface to an adjacent one of the multiple second concave sections along a rotating direction of the at least one mounting component.

According to one aspect of the present disclosure, the power strip offers an overall aesthetically pleasing design, saves space, and accommodates both desktop and wall-mounted applications. It enhances installation flexibility.

DETAILED DESCRIPTION

Below, embodiments of the present disclosure will be described in greater detail with reference to the drawings. Apparently, the described embodiments are merely part of, rather than all of, the embodiments of the present disclosure. Based on the described embodiments of the present disclosure, any other embodiment obtained by a person skilled in the art without paying creative efforts shall also fall within the scope of the present disclosure.

Figure 1:
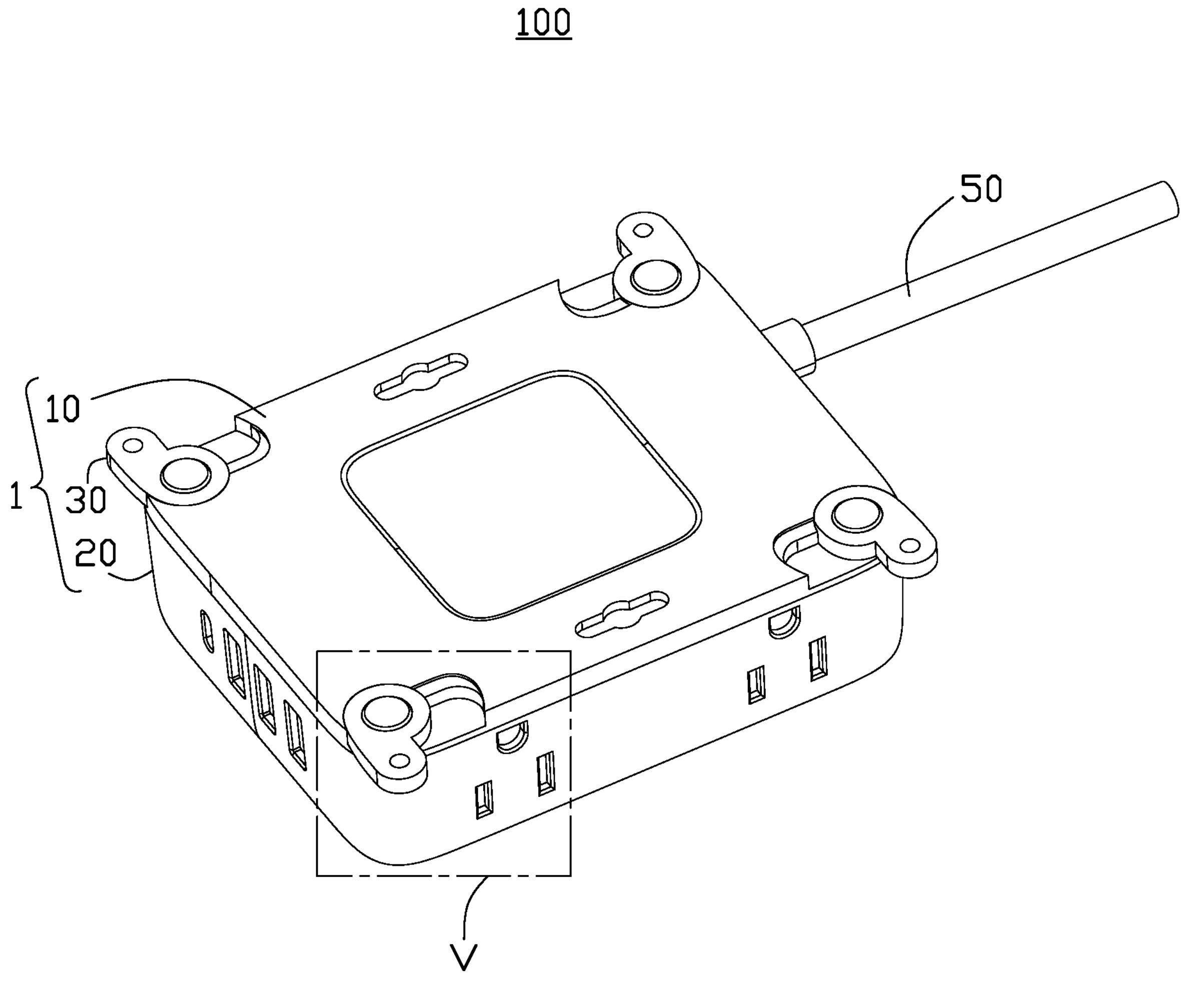
FIG. 1 is a schematic three-dimensional view of a power strip according to the present disclosure.
Figure 2:
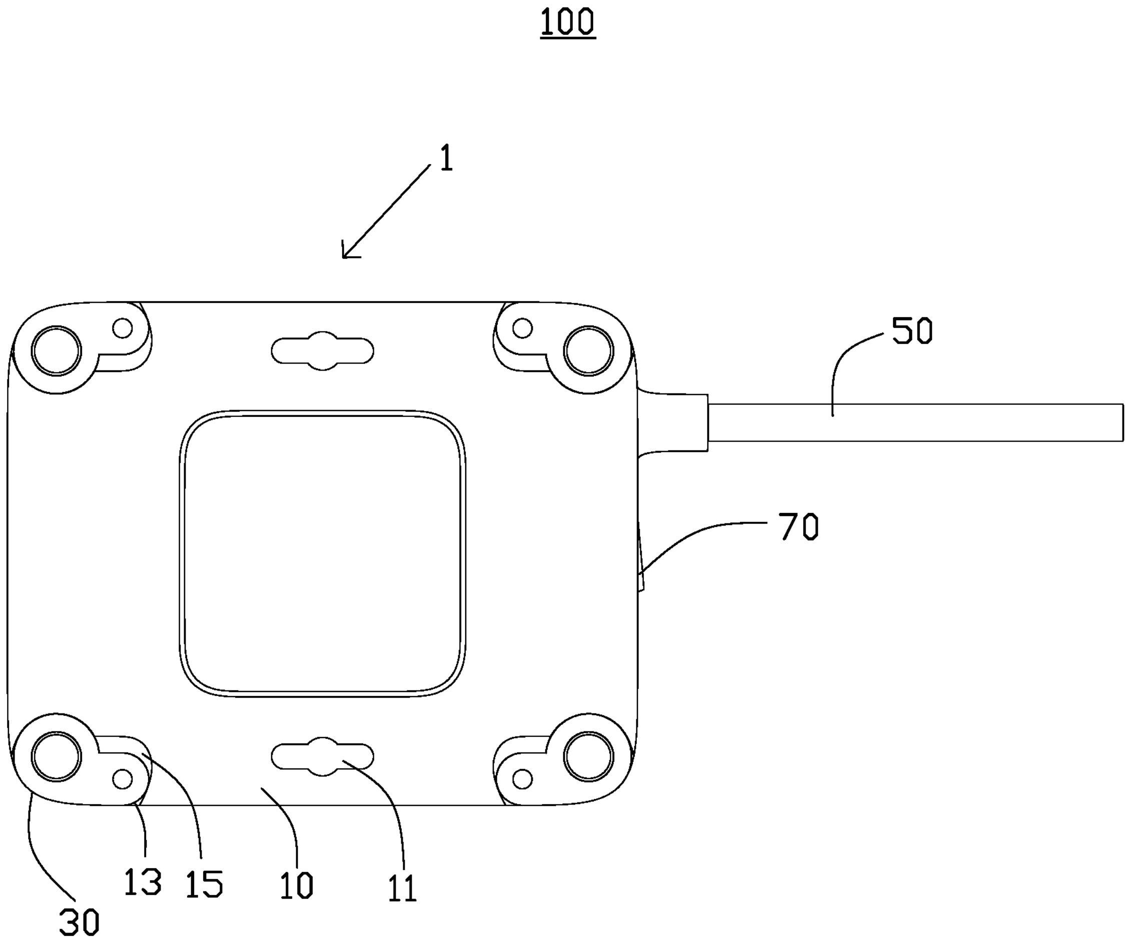
FIG. 2 is a schematic view showing a mounting component of the power strip in FIG. 1 in a closed state.
Figure 3:
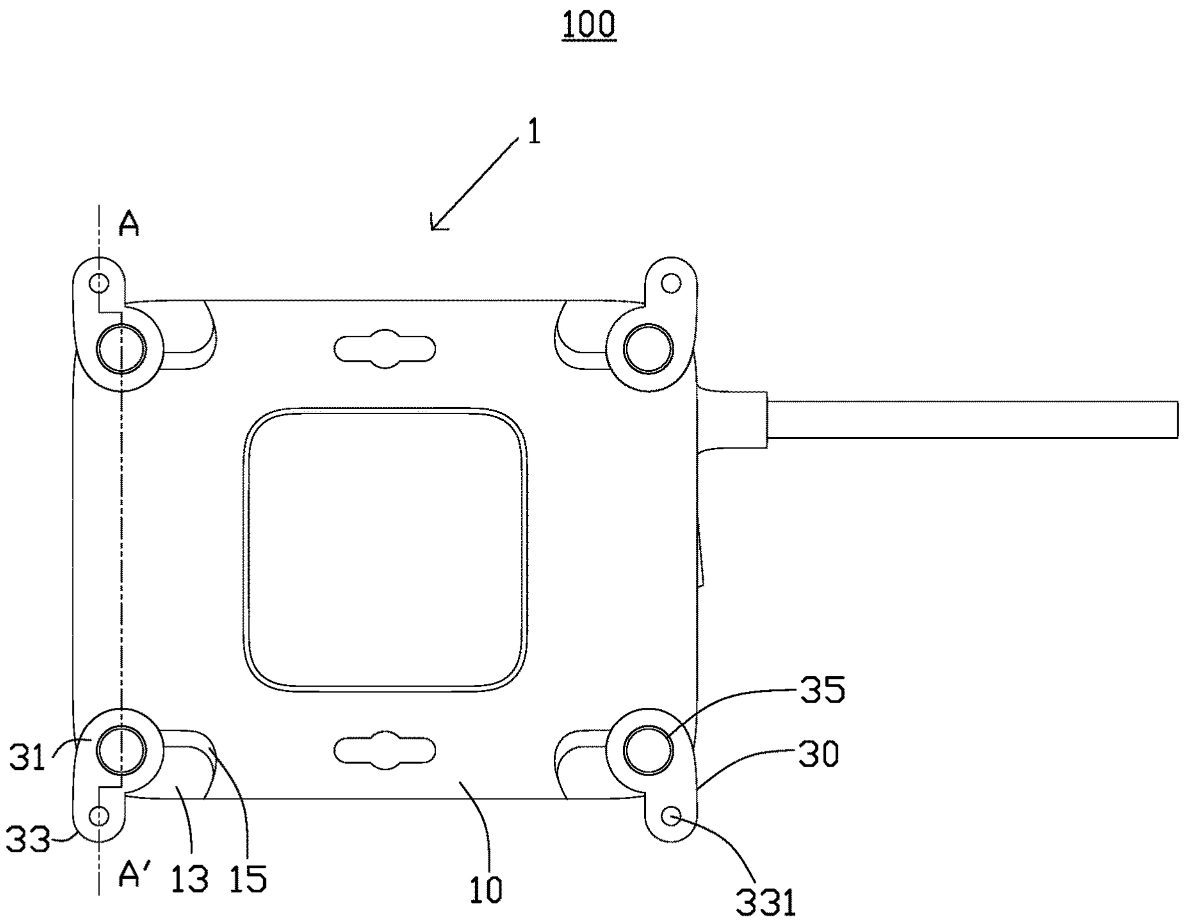
FIG. 3 is a schematic view showing the mounting component of the power strip in FIG. 1 in an open state.
Figure 4:
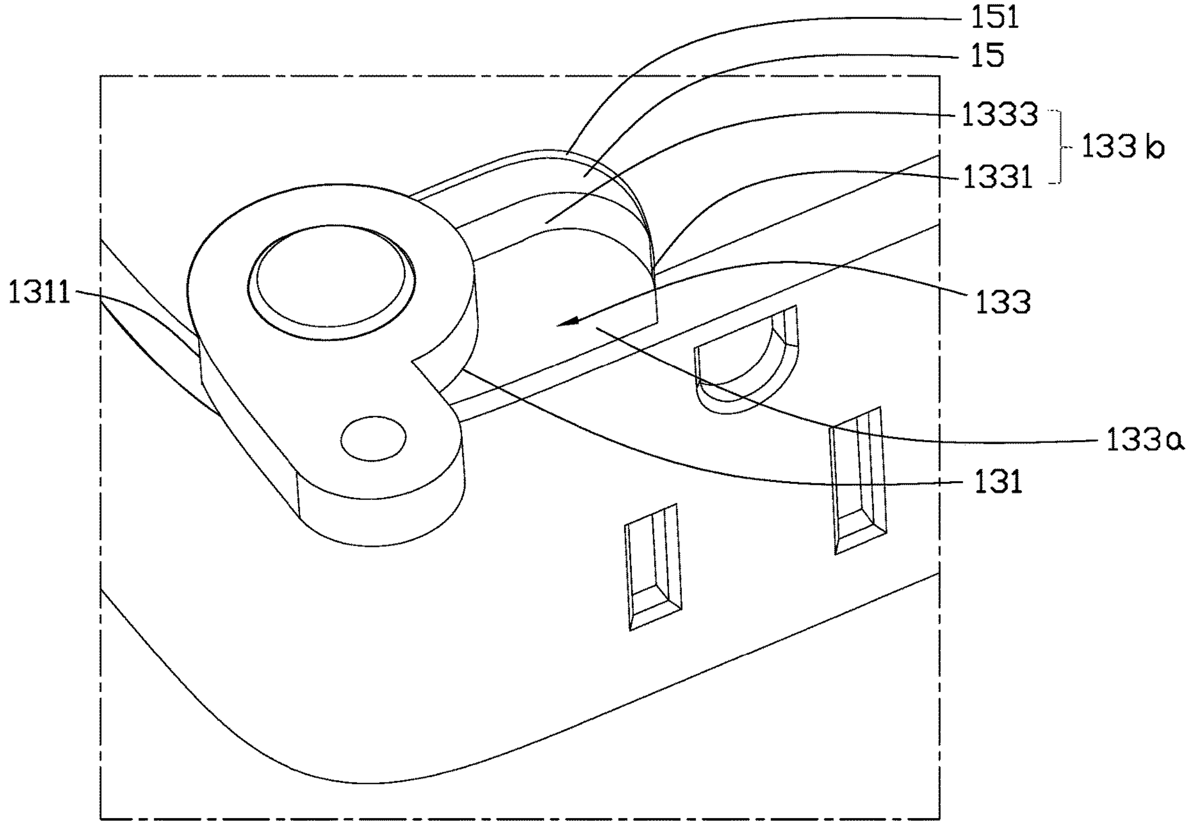
FIG. 4 is an enlarged schematic view of a portion V of the power strip in FIG. 1.
Figure 6:
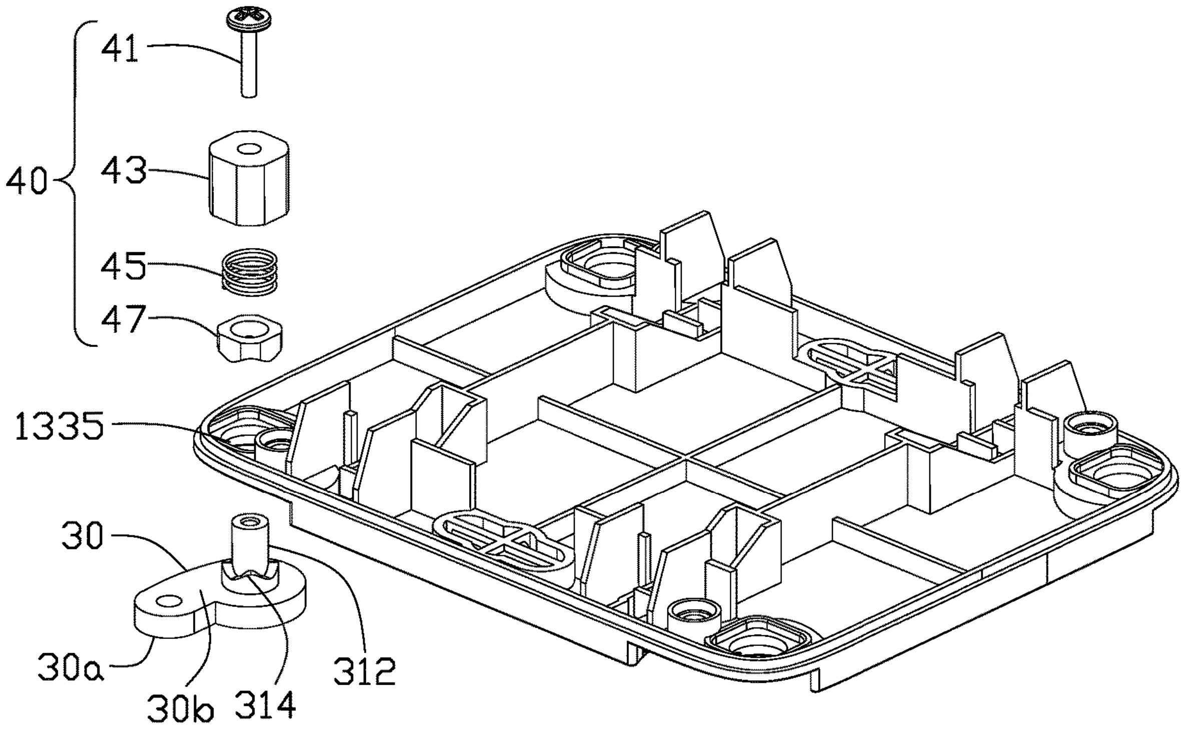
FIG. 6 is a schematic exploded and partially disassembled view showing a part of the power strip.
Figure 7:
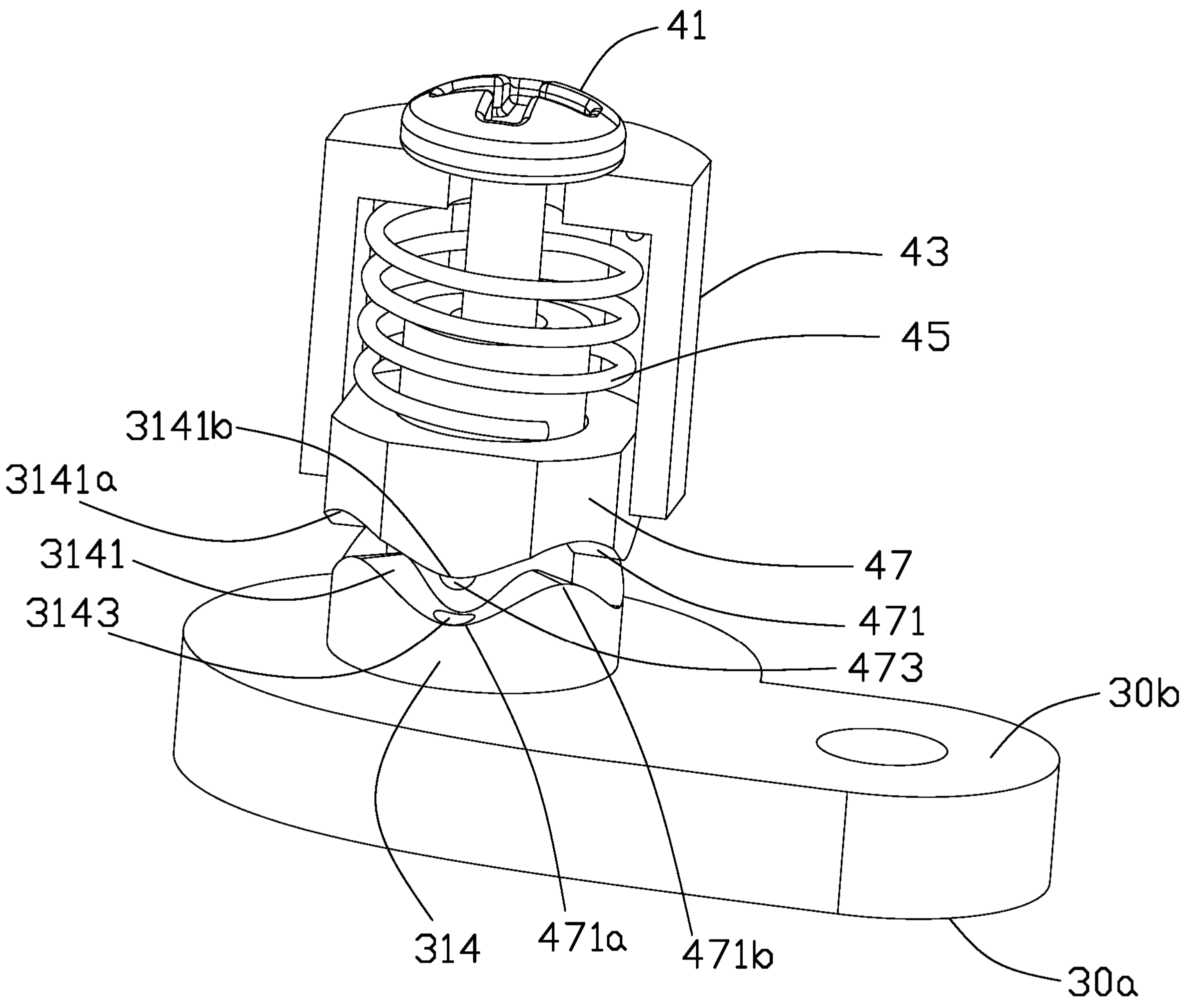
FIG. 7 is a schematic view showing a mounting component and a fixing structure of the power strip.
Figure 8:
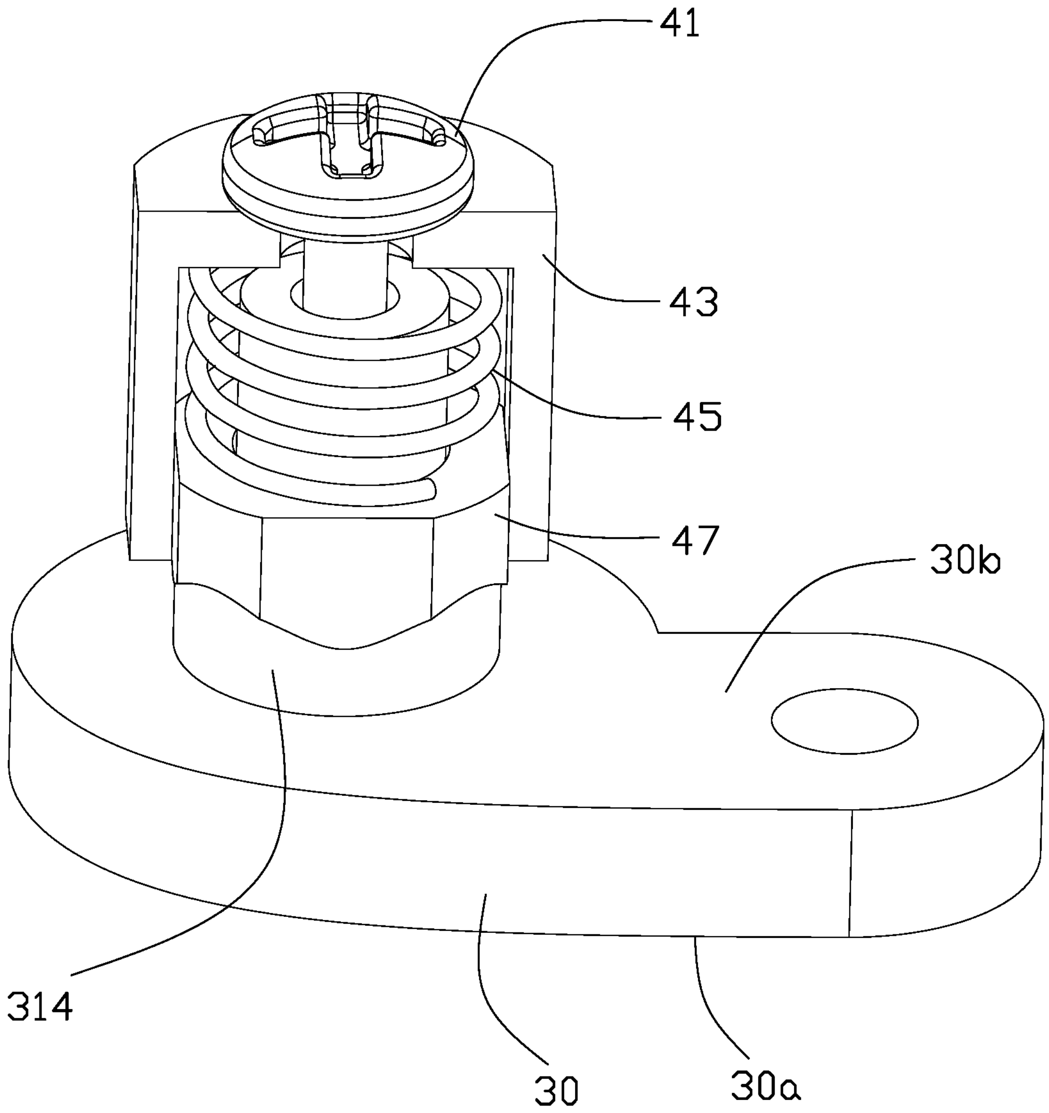
FIG. 8 and FIG. 9 are schematic views illustrating the mounting component rotated to different positions.
Figure 9:
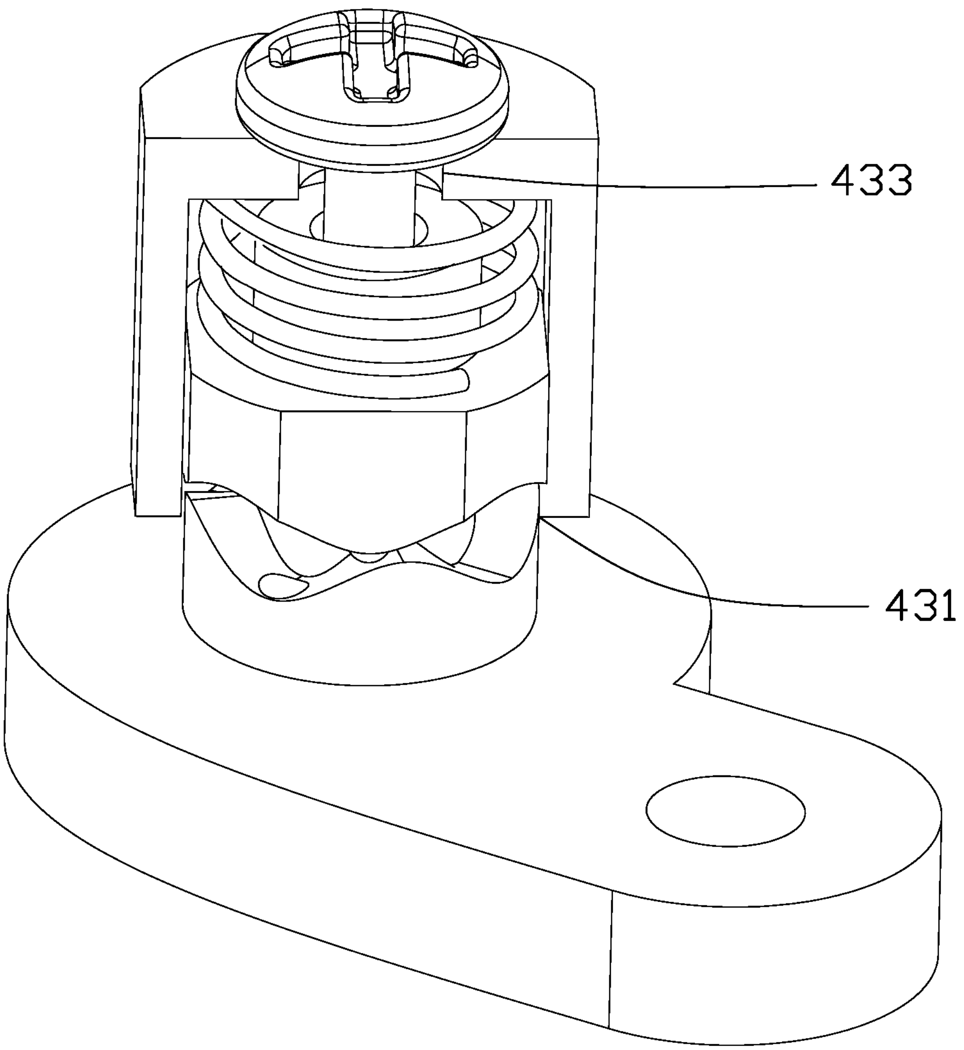

Referring to FIGS. 1-9, the present disclosure relates to a power strip 100. FIG. 1 is a schematic three-dimensional view of the power strip 100 according to the present disclosure. FIG. 2 shows a closed state of the mounting component 30 of the power strip 100, and FIG. 3 shows an open state of the mounting component 30 of the power strip 100. FIG. 4 is an enlarged view of the V portion of FIG. 1, and FIGS. 5-7 are used to illustrate the configuration related to the rotating action of the mounting component 30, and FIGS. 8-9 are used to illustrate the rotating action of the mounting component 30.

The power strip 100 of the present disclosure includes a main body 1, which includes a supporting surface 10, a socket surface 20, and a mounting component 30 that is movably mounted on the main body 1.

The main body 1 is box-shaped, and internal structure of the main body 1 is the same as that of a general power strip, so relevant descriptions are omitted. The supporting surface 10 included in the main body 1 is arranged opposite to the socket surface 20 included in the main body 1. The supporting surface 10 may contact a desktop or a wall surface as a placement or installation surface. One or more electrical connection structures (not shown), such as connection holes and connectors that match the plugs, is set inside the main body 1 and exposed partially from the socket surface 20 The connection holes of the one or more electrical connection structures may be set on any outer surface of the socket surface 20. In addition, as shown in FIGS. 1-3, the supporting surface 10 is rectangular in plain view, but it can also be polygonal, circular, elliptical, irregular, or the like, and is not limited to this, and its shape can be arbitrarily set. Correspondingly, the socket surface 20 can match the shape of the supporting surface 10, and its shape is not particularly limited.

In addition, an outside of the main body 1, the power strip 100 includes a power cord 50 connected to an external power source and a switch 70 that controls the power supply to the power strip 100. Although the power cord 50 and the switch 70 are shown on one outer surface of the power strip 100 in FIGS. 2 and 3, they may also be located on any other outer surface of the socket surface 20. Additionally, the switch 70 can be appropriately modified according to requirements, for example, it can be set to control the total power supply of the power strip 100, or it can be set to control multiple power connections (not shown) of the power strip 100, or both can be included.

Furthermore, the main body 1 comprises one or more mounting components 30 movably installed on a supporting surface 10. The mounting components 30 can be rotatably mounted on the supporting surface 10 to mount the power strip 100 on a wall or place it on a desk. The number of mounting components 30 can be appropriately determined based on the shape of the supporting surface 10. For example, in the illustrated embodiment of FIGS. 1 to 3, where the supporting surface 10 is rectangular, four mounting components 30 are provided and arranged at the four corners of the supporting surface 10. Moreover, preferably, the four corners of the rectangular supporting surface 10 are rounded. It will be appreciated that the number of mounting components 30 can be one or more depending on actual requirements.

In addition, a receiving space 13 is provided at a position corresponding to each of the mounting components 30. Each receiving space 13 is defined by a from the supporting surface 10 towards the socket surface 20, a part of an edge of the supporting surface 10 communicates to an exterior of the main body 1 via the at least one receiving space 13, the recess is on a first plane 133*a*.

In the illustrated embodiment of FIG. 4, four receiving spaces 13 are provided at the four corners of the supporting surface 10, each receiving space 13 is recessed from the supporting surface 10 towards the socket surface 20 side, and the receiving spaces 13 is recessed to the outside of the main body 1 and penetrates through two sides of the supporting surface 10. The receiving spaces 13 are used for movably receiving the mounting components 30. Preferably, the first surface 30*a* of the mounting components 30 is flush with the supporting surface 10, so that the supporting surface 10 can be smoothly installed or placed regardless of the state of the mounting components 30.

In this embodiment, as shown in FIG. 4, each receiving space 13 includes a first receiving groove 131 and a second receiving groove 133 that communicates with the first receiving groove 131. The mounting component 30 can be switched between a closed state received within the supporting surface 10 and an open state extending outwards from the supporting surface 10, by rotating on the first plane 133*a* at the first receiving groove 131 and the second receiving groove 133, with the rotation axis of the mounting component 30 being perpendicular to the supporting surface 10.

In this embodiment, the first receiving groove 131 is recessed from the supporting surface 10 at the four corners of the supporting surface 10 towards the socket surface 20, and the first receiving groove 131 penetrates through both sides of each corner to the outside of the main body 1. The first receiving groove 131 comprises a circular structure, but it should be understood that its shape can be configured to different structures as required, such as rectangular, elliptical, triangular, or partial shapes of the aforementioned shapes. The second receiving groove 133 extends from one side of the first receiving groove 131 towards the direction away from the first receiving groove 131 and one side of the second receiving groove 133 communicates to an exterior of the main body, so that the second receiving groove 133 communicates with the first receiving groove 131. That is to say, of the receiving spaces 13 communicated through both sides (also referred to as the first side and the second side) to the outside of the main body 1, the first receiving groove 131 communicates only with the first side, while the second receiving groove 133 communicates with the second side. In this embodiment, as shown in FIGS. 2 and 4, the width and length of the first receiving groove 131 communicating with the first side towards the main body 1 are greater than those of the second receiving groove 133 communicating with the first side, but it should be understood that the length and width of the second receiving groove 133 communicating with the first side and the length and width of the first receiving groove 131 communicating with the first side can be arbitrarily set according to actual needs.

In this embodiment, as shown in FIGS. 2 and 4, because a first plane 133*a* of the receiving space 13 is formed by recessing from the supporting surface 10 towards the socket surface 20, and the receiving space 13 penetrates a part of at least one edge of the supporting surface 10 toward the outside of the main body 1. a sidewall 133*b* of the receiving space 13 connects the receiving space 13 and a first plane 133*a* of the supporting surface 10. The sidewall 133*b* connecting the surface of the second receiving groove 133 with the supporting surface 10 includes a first sidewall 1331 and a second sidewall 1333 connected to the first sidewall. The first sidewall 1331 and the second sidewall 1333 stand up from the surface of the second receiving groove 133 and connect the surface of the second receiving groove 133 with the supporting surface 10. When the mounting component 30 moves, the first sidewall 1331 does not contact the mounting component 30, thereby allowing the mounting component 30 to move smoothly and without interference inside the receiving space 13. The second sidewall 1333 is located within the supporting surface 10 relative to the first sidewall 1331. The second sidewall 1333 formed to match the edge on the opposite side of the second sidewall 1333, so that in a top view, the mounting component 30 is completely housed inside the receiving space 13. When the mounting component 30 is housed inside the receiving space 13, it abuts against the second sidewall 1333.

At position corresponding to each mounting component 30, a slide out portion 15 is set on the supporting surface 10. Each slide out portion 15 in the supporting surface 10 is formed by recessing towards the socket surface 20 from a position near the sidewall of the receiving space 13, such as the second sidewall 1333, and the slide out portion 15 penetrates through a part of the second sidewall 1333 towards the receiving space 13. The slide out portion 15 is located closer to the interior of the supporting surface 10 than the mounting component 30. When the mounting component 30 is housed inside the receiving space 13, at least a part of the slide out portion 15 is a certain distance from the mounting component 30, creating a gap between the mounting component 30 and the supporting surface 10, which allows the mounting component 30 to be withdrawn from the receiving space 13. When the mounting component 30 is housed inside the receiving space 13, it abuts against the second sidewall 1333, forming a gap between the mounting component 30 and the slide out portion 15. Moreover, a third sidewall 151 is formed between the slide out portion 15 and the supporting surface 10 that raising from the surface of the slide out portion 15 and connected to the supporting surface 10. Thus, in this embodiment, the supporting surface 10, the slide out portion 15, and the surface of the second receiving groove 133 form a three-stage step structure that is recessed inward step by step.

Alternatively, an oblique surface may be formed gradually from the supporting surface 10 towards the second receiving groove 133, to replace the slide out portion 15 formed as a step surface of the step structure. When the mounting component 30 is housed inside the receiving space 13, at least a part of the oblique surface of the slide out portion 15 abuts against the mounting component 30, forming a gap between them, which allows the mounting component 30 to be withdrawn from the receiving space 13.

The edge 1311 of the opening of the first receiving groove 131 on the second side constitutes a limiting portion that limits the angle at which the mounting component 30 can be opened. In this embodiment, as shown in FIG. 3, the edge 1311 limits the maximum angle at which the mounting component 30 can be opened to 90 degrees. When the mounting component 30 is moved outwardly from the closed state by 90 degrees, one side of the mounting section 33 abuts against the edge 1311. It can be understood that by adjusting the position of the edge 1311, the maximum angle at which the mounting component 30 can be opened can be changed, thereby improving the degree of freedom of installation. Alternatively, the edge 1311 on the second side may be replaced by a second receiving groove 133 that is provided on the second side in the same manner as on the first side. That is, for each of the two receiving spaces 13 that penetrate through the two sides of the main body 1, the first receiving groove 131 and the second receiving groove 133 are open towards the first side and the second side, respectively, further improving the degree of freedom of installation.

In this embodiment, the mounting component 30 may be long strip and includes a rotating portion 31 and a mounting portion 33 extending outward from the rotating portion 31. The mounting portion 33 includes a mounting hole 331 for securely mounting the power strip 100 on a fixed surface such as a wall. The mounting component 30 can rotate upward on the supporting surface 10. For the mounting component 30, the rotating portion 31 can rotate and drive the mounting portion 33 to switch between a closed state received within the supporting surface 10 and an open state rotating outward away from the main body 1 relative to the supporting surface 10. Furthermore, the mounting component 30 can also include a soft cushion 35 set on the first surface 30*a*. In this embodiment, a fitting groove 311 is formed on the first surface 30*a* of the rotating portion 31. The soft cushion 35 is inserted into the fitting groove 311 and can be made of silicone. Thus, when using the power strip 100, the soft cushion 35 contacts the tabletop to prevent the power strip 100 from sliding on or directly contacting the tabletop. Alternatively, the soft cushion 35 contacts the wall to prevent the main body 1 of the power strip 100 from directly contacting and colliding with the wall.

In addition, there is at least one fixing structure 40 fixed internally in the main body 1 to secure one or more mounting components 30 and enable them to switch between a closed state and an open state without falling off the supporting surface 10. At the first receiving groove 131, a through hole 1335 penetrates through the first plane 133*a*, and the fixing structure 40 is connected to the mounting component 30 through the through hole 1335.

Referring to FIGS. 5 to 9, this embodiment further illustrates the rotating action of the mounting component 30 and the related structure during the rotating action. For the purpose of illustration, the details inside the main body 1 are omitted in FIGS. 5 and 6, and part of the fixing cylinder 43 of the fixing structure 40 is omitted in FIGS. 7 to 9.

Figure 5:
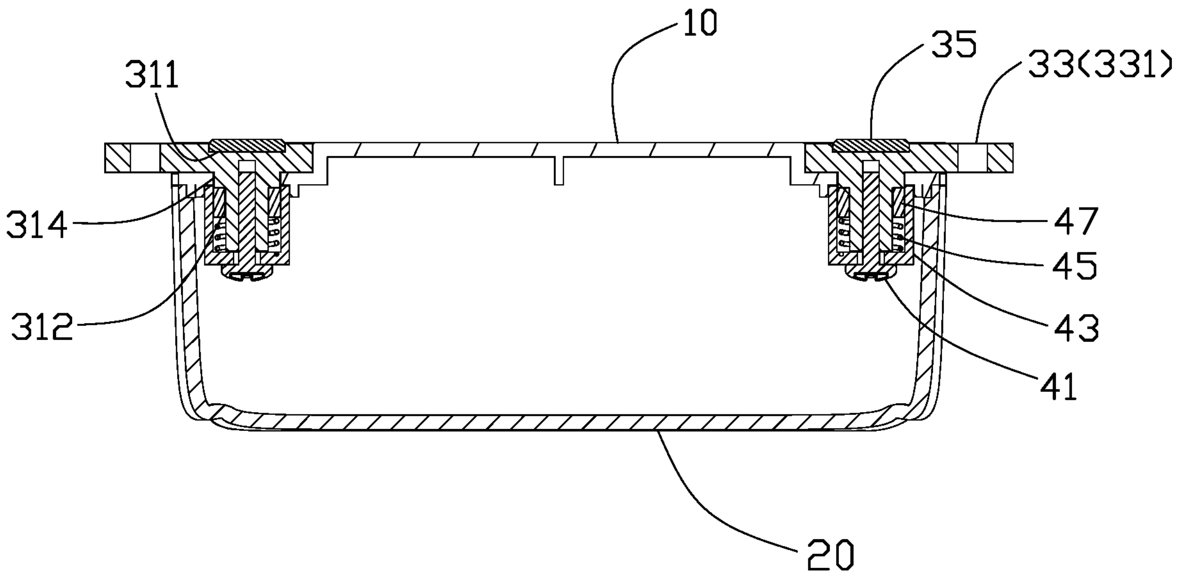
FIG. 5 is a sectional view of the power strip, taken along a view line A-A' as shown FIG. 3.

As shown in FIGS. 5 and 6, the mounting component 30 includes a pivot portion 312. The pivot portion 312 is set in the rotating portion 31 of the mounting component 30, is erected perpendicularly from the second surface 30*b* of the mounting component 30 facing the supporting surface 10 along the rotational center axis of the mounting component 30, passes through the through hole 1335 of the first receiving groove 131, and is connected to the corresponding fixing structure 40 inside the main body 1, thereby allowing the mounting component 30 to be movably installed on the fixing structure 40.

The fixing structure 40 corresponding to the mounting component 30 is provided on a surface of the opposite side of the supporting surface 10. The fixing structure 40 includes fastener 41, fixing cylinder 43, elastic member 45, and fitting portion 47. The fastener 41 is connected to the pivot portion 312 of the mounting component 30 and abuts against the fixing cylinder 43 and can rotate relative to the fixing cylinder. The fixing cylinder 43 is fixed on the supporting surface 10 of the main body 1 on the inner side.

In this embodiment, the fixing cylinder 43 is a hollow cylindrical member with openings at both ends. The first opening 431 of one end of the fixing cylinder 43 passes through a part or the entirety of the end surface of the one end, and the second opening 433 of the other end of the fixing cylinder 43 passes through a part of the end surface of the other end. It will be understood that the shape, position, and size of the openings of the fixing cylinder 43 can be changed as required. The pivot portion 312 of the rotating portion 31 passes through the first opening 431 and enters the interior of the fixing cylinder 43 without contacting the fixing cylinder 43. A part of the fastener 41, such as a screw, passes through the second opening 433 of the other end of the fixing cylinder 43 and is connected to the pivot portion 312. The size of the second opening 433 is larger than that of a part of the fastener 41 that does not pass through the second opening 433 and does not contact the fastener 41. Another portion of the fastener 41, such as a screw head, abuts against the end surface of the other end, so that the rotating portion 31 of the mounting component 30 abuts against the surface on the outer side of the main body 1 of the supporting surface 10. The end surface of one end of the fixing cylinder 43 abuts against the surface of the main body 1 on the inner side of the supporting surface 10. Additionally, preferably, a limit portion that restricts movement of the fixing cylinder 43 of the fixing structure 40 is provided on the surface on the inner side of the supporting surface 10 of the main body 1.

In this embodiment, the mounting component 30 further includes a flange section 314 set in the rotating section 31. The flange section 314 is erected perpendicularly from the second surface 30*b* of the mounting component 30 and is located outside the pivot portion 312. Correspondingly, the fitting portion 47 and the elastic member 45 of the fixing structure 40 are mounted on the pivot portion 312 of the rotating section 31, and the fitting portion 47 and the flange section 314 can be fitted mutually.

In the present embodiment, the fitting portion 47 is a ring-shaped cross-sectional structure. The ring-shaped structure with an inner ring (inner wall) passing through pivot portion 312 an outer ring (outer wall) having a shape that fits with the inner wall of the fixed cylinder 43 to restrict the rotation of the fitting portion 47 while not restricting the movement of the fitting portion 47 along the inner wall of the fixed cylinder 43. A fitting surface 471 of the fitting portion 47 abuts the top surface 3141 of the flange section 314, which is vertically erected. The top surface 3141 and the fitting surface 471 have matching shapes, so that the flange section 314 and the fitting portion 47 can be mated together. Furthermore, one end of the elastic member 45 abuts the surface on the opposite side of the fitting surface 471 of the fitting portion 47, and the other end abuts the inner wall of the end surface of the second opening 433, so that the elastic member 45 is compressed to a weakly compressed state.

In the present embodiment, as shown in FIG. 7, the top surface (the second fitting surface) 3141 and the fitting surface (the first fitting surface) 471 are each provided with multiple concave sections 3141*a*, 471*a* with the same shape and multiple convex sections 3141*b*, 471*b* with the same shape, and the concave sections and the convex sections of the top surface 3141 and the fitting surface 471 are alternately and adjacent to each other to form a smooth and continuous concave-convex surface. The shapes of the top surface 3141 as the second fitting surface and the fitting surface 471 as the first fitting surface match each other, and it can be understood that the shapes of the convex sections and the concave sections can be appropriately changed.

Next, referring to FIGS. 8 and 9, the rotation action of the mounting component 30 will be specifically described. In FIG. 8, before applying force to the mounting component 30, the fitting portion 47 is mated with the flange section 314. At this time, multiple concave sections 3141*a* of the top surface 3141 can respectively mate with multiple convex sections 471*b* of the fitting surface 471, and multiple convex sections 3141*b* of the top surface 3141 can respectively mate with multiple concave sections 471*a* of the fitting surface 471.

Next, force is applied to the mounting component 30 to rotate it. At this time, the flange section 314 rotates, and the convex section of the flange section 314 that was originally mated with the concave section of the fitting portion 47 and the concave section of the flange section 314 that was originally mated with the convex section of the fitting portion 47 are displaced, as shown in FIG. 9, to become the convex section of the flange section 314 that abuts the convex section of the fitting portion 47, so that the fitting portion 47 and the flange section 314 are not mated and have a gap. Furthermore, as the flange section 314 rotates, the fitting portion 47 is lifted and moved in the direction away from the flange section 314, so that the elastic member 45 is further compressed into a strongly compressed state.

When the force on the mounting component 30 is released, due to strong compression of elastic member 45, the convex section of the flange section 314 on the convex section located at the fitting portion 47 moves towards the adjacent concave section in the fitting portion 47, becoming fitted in the concave section while the elastic member 45 returns to a weakly compressed state.

By setting the fitting portion 47 and the flange section 314 with concave-convex surfaces, the mounting component 30 can provide good feedback to users when opening towards the outside of the main body 1, and when there is a plurality of mounting components 30, which can ensure that each mounting component 30 opens at the same angle, achieving an aesthetically pleasing and convenient positioning during installation. Additionally, by setting multiple concave and convex sections on the concave-convex surface, the mounting component 30 can be opened at multiple angles, increasing installation freedom.

Preferably, restriction portions are set in the fitting portion 47 and the flange section 314, such as a restriction salient point 473 set on the fitting surface 471 of the fitting portion 47 shown in FIG. 7, corresponding to an indentation 3143 set on the top surface 3141 of the flange section 314. In FIG. 7, for illustrative purposes, the fitting portion 47 and the flange section 314 are not fitted. Moreover, it can be understood that the positions of the restriction convex point and the restriction concave groove can be interchanged between the fitting portion 47 and the flange section 314, and their shapes can be appropriately changed as long as they can play a structural role in restricting further rotation between the fitting portion 47 and the flange section 314. Thus, wear on the edge 1311 of the opening on the second side of the first receiving groove 131 serving as the restriction portion can be avoided by the mounting component 30. When the restriction convex point is set on any convex section in contact with the fitting portion 47 and the flange section 314, the fitting portion 47 and the flange section 314 abut against each other by the restriction convex point.

It is apparent to those skilled in the art that the present disclosure is not limited to the details of the exemplary embodiments described above and can be implemented in other specific forms without departing from the spirit or essential characteristics of the present disclosure. Therefore, the exemplary embodiments should be considered illustrative and non-limiting, and the scope of the present disclosure is determined by the appended claims rather than the foregoing description. Thus, any diagrammatical markers in the claims should not be viewed as limiting the claims.

What is claimed is:

1. A power strip, comprising:

a main body comprising a plurality of surfaces defining an inner chamber configured to receive one or more electrical connection structures, wherein the plurality of surfaces comprise a supporting surface and a first socket surface; connection holes are defined on the first socket surface; the one or more electrical connection structures are configured to be electrically connected to a plug via the connection holes;

at least one receiving space formed on the supporting surface;

at least one mounting component, wherein the supporting surface is mountable on a fixed surface via the at least one mounting component; and at least one fixing structure corresponding to the at least one receiving space, wherein each of the at least one fixing structure is configured to rotatably mount a corresponding one of the at least one mounting component on the supporting surface, wherein the at least one mounting component is switchable between a closed state and an open state, in the closed state, each of the at least one mounting component is received in a corresponding one of the at least one receiving space, and in the open state, the at least one mounting component is rotated relative to the main body and is extended out of the corresponding receiving space.

2. The power strip according to claim 1, wherein in the closed state, the at least one mounting component is completely received in the supporting surface in the closed state, and a top surface of the at least one mounting component is flush with the supporting surface.

3. The power strip according to claim 1, wherein, the at least one receiving space is defined by a recess from the supporting surface towards the first socket surface, a part of an edge of the supporting surface communicates to an exterior of the main body via the at least one receiving space, the recess is on a first plane, and the at least one mounting component is configured to move into the corresponding receiving space when switching between the closed state and the open state.

4. The power strip according to claim 3, wherein, the at least one receiving space is further defined by a sidewall of the supporting surface, the sidewall is connected to the first plane, the sidewall rises from the first plane of the at least one receiving space to the supporting surface, and in the closed state, the at least one mounting component is completely received in the corresponding receiving space and abuts against at least a part of the sidewall.

5. The power strip according to claim 4, wherein, the supporting surface further defines at least one slide out portion, the at least one slide out portion corresponds to a corresponding one of the at least one mounting component, the at least one slide out portion is formed by recessing from the supporting surface towards the first socket surface, extending to the at least one receiving space and penetrating a part of the sidewall, and a gap is defined between at least a part of the at least one slide out portion and the corresponding mounting component.

6. The power strip according to claim 5, wherein, a step shape is formed between the supporting surface and the first plane of the at least one receiving space, and the step shape is formed by the at least one slide out portion.

7. The power strip according to claim 4, wherein, the supporting surface further comprises at least one slide out portion, the at least one slide out portion corresponds to a corresponding one of the at least one mounting component, at least one slide out portion is formed by an oblique surface of the sidewall, and a gap is defined between at least a part of the at least one slide out portion and the corresponding mounting component.

8. The power strip according to claim 1, wherein, the at least one mounting component comprises a rotating portion and a mounting portion extending from the rotating portion, and mounting holes are defined on the mounting portion.

9. The power strip according to claim 8, wherein, each of the at least one receiving space is further defined by a first groove corresponding to a rotating portion; and a second groove corresponding to the corresponding mounting portion, and the first groove and the second groove communicates with each other.

10. The power strip according to claim 7, wherein, the at least one receiving space is further defined by at least one corner of the supporting surface.

11. The power strip according to claim 7, wherein, the at least one receiving space is further defined by at least one edge of the supporting surface.

12. A power strip comprising:

a main body comprising a supporting surface, a socket surface, and one or more electrical connection structures disposed inside the main body, at least one mounting component, wherein the supporting surface is mountable on a fixed surface via the at least one mounting component; and at least one fixing structure corresponding to the at least one receiving space, wherein each of the at least one fixing structure is configured to rotatably mount a corresponding one of the at least one mounting component on the supporting surface, wherein:

the at least one mounting component defines a first fitting surface, and the at least one fixing structure defines a second fitting surface engaged with the first fitting surface of the corresponding mounting component, multiple first concave sections and multiple first convex sections are defined on the first fitting surface, the multiple first concave and convex sections are alternately arranged, multiple second convex sections and multiple second concave sections are defined on the second fitting surface, the multiple second convex and concave sections are alternately arranged, and the first fitting surface is rotates relative to the second fitting surface when the at least one mounting component rotates, thereby causing each of the multiple first convex section of the first fitting surface to move from one of the multiple second concave sections of the second fitting surface to an adjacent one of the multiple second concave sections along a rotating direction of the at least one mounting component.

13. The power strip according to claim 12, wherein, the at least one mounting component is rotatable to different angles such that the supporting surface is open to an exterior at the different angles.

14. The power strip according to claim 12, wherein, the at least one fixing structure further comprises a fitting portion, and the fitting portion further defined the second fitting surface, the fitting portion is configured to move vertically relative to the corresponding mounting component when the mounting component rotates, the second fitting surface of the fitting portion maintains abutting against the first fitting surface of the corresponding mounting component when the fitting portion moves vertically relative to the corresponding mounting component.

15. The power strip according to claim 14, wherein, the at least one fixing structure further comprises a fixing cylinder fixed on the supporting surface, the at least one mounting component is rotatably connected to the corresponding fixing structure through the fixing cylinder, the fitting portion is embedded in the fixing cylinder, and the fixing cylinder comprises an inner wall, the inner wall is configured to prevent the fitting portion from rotating and facilitate the fitting portion to move vertically.

16. The power strip according to claim 14, wherein, the at least one fixing structure further comprises an elastic member abutting against the fitting portion, the first fitting surface and the second fitting surface maintain contact with each other by the elastic member when the at least one mounting component rotates.

17. The power strip according to claim 16, wherein, the at least one fixing structure further comprises a fixing cylinder fixed on the supporting surface, the at least one mounting component is rotatably connected to the corresponding fixing structure through the fixing cylinder, the fixing cylinder internally receives the fitting portion and the elastic member, and defines an inner wall that prevent the fitting portion from rotating, one end of the elastic member abuts against the fitting portion, another end of the elastic member abuts against the fixing cylinder, the elastic member is compressed between the fixing cylinder and the fitting portion, the first fitting surface and the second fitting surface maintains contact with each other by the elastic member when the at least one mounting component rotates.

18. The power strip according to claim 12, wherein, one of the first fitting surface and the second fitting surface is provided with a protrusion, another of the first fitting surface and the second fitting surface is provided with an indentation, and the protrusion is received in the indentation.

19. The power strip according to claim 12, wherein, the at least one fixing structure is positioned in the main body of the power strip, and is separated from the corresponding mounting component by the supporting surface, the at least one mounting component is rotatably connected to the corresponding fixing structure, and the at least one fixing structure is configured to prevent the corresponding mounting component from moving vertically on the supporting surface when the corresponding mounting component rotates.

20. The power strip according to claim 12, wherein, the multiple first convex sections and the multiple first concave sections on the first fitting surface cooperatively form a smooth and continuous concave-convex surface, and the multiple second convex sections and the second concave sections on the second fitting surface form a smooth and continuous concave-convex surface.

* * * * *